(12) United States Patent
Schelbach et al.

(10) Patent No.: US 6,379,752 B1
(45) Date of Patent: Apr. 30, 2002

(54) RUBBER-METAL COMPOSITE

(75) Inventors: Ralf Schelbach, Hilden; Ilona Lange, Langenfeld, both of (DE)

(73) Assignee: Henkel Kommanditgesellschaft auf Aktien, Dusseldorf (DE)

( * ) Notice: Subject to any disclaimer, the term of this patent is extended or adjusted under 35 U.S.C. 154(b) by 0 days.

(21) Appl. No.: 09/509,046

(22) PCT Filed: Dec. 4, 1998

(86) PCT No.: PCT/EP98/07904

§ 371 Date: Mar. 21, 2000

§ 102(e) Date: Mar. 21, 2000

(87) PCT Pub. No.: WO99/30841

PCT Pub. Date: Jun. 24, 1999

(30) Foreign Application Priority Data

Dec. 13, 1997 (DE) .......................... 197 55 421

(51) Int. Cl.$^7$ .............................. B05D 1/38; B05D 3/02
(52) U.S. Cl. ...................... 427/409; 427/410; 427/413
(58) Field of Search ................................ 427/409, 410, 427/413; 428/416, 418, 425.8, 461, 462, 463, 465, 466, 494

(56) References Cited

U.S. PATENT DOCUMENTS

| 5,200,455 A | 4/1993 | Warren ....................... 524/413 |
| 5,385,979 A | 1/1995 | Ozawa et al. ............... 525/145 |

FOREIGN PATENT DOCUMENTS

| CA | 1 084 787 | 9/1980 |
| CA | 1 148 896 | 6/1983 |
| DE | 27 48 686 | 5/1978 |
| DE | 44 01 566 | 7/1995 |
| DE | 195 15 534 | 10/1996 |
| DE | 196 35 616 | 9/1997 |
| EP | 0 32 297 | 7/1981 |
| EP | 0 54 861 | 6/1982 |
| EP | 0 374 772 | 6/1990 |
| WO | WO93/15154 | 8/1993 |
| WO | WO93/16813 | 9/1993 |
| WO | WO94/06861 | 3/1994 |
| WO | WO97/07163 | 2/1997 |
| WO | WO99/37713 | 7/1999 |

OTHER PUBLICATIONS

Automotive Paints And Coatings p. 65 (1995).

*Primary Examiner*—D. S. Nakarani
(74) *Attorney, Agent, or Firm*—Stephen D. Harper

(57) ABSTRACT

A process for producing a rubber-metal composite on a metal, characterized in that:

(a) a self-depositing resin is deposited on the metal and cured;
(b) if desired, a primer is applied to the resin;
(c) a binder is applied to the primer or the self-depositing resin;
(d) a natural or synthetic rubber is applied to the binder; and
(e) the rubber is vulcanized at a temperature within the range from 90 to 220° C.;

and also a composite structure obtainable hereby.

20 Claims, No Drawings

RUBBER-METAL COMPOSITE

This invention relates to a process for producing a rubber-metal composite, the innovation consisting in the application of a layer of a self-depositing resin to the metal before the rubber is vulcanised-on in a subsequent step. The present invention further relates to a composite structure prepared from metal and rubber, which contains between the metal surface and the rubber a cured layer of a self-depositing resin. Such composite structures are applicable in many areas of industry. Vehicle and machine manufacture are examples.

One requirement which rubber-metal composite structures must naturally meet is sufficiently firm adhesion between the rubber and the metal. Adhesion is sufficiently firm when adhesion tests in which the composite prepared from rubber and metal is torn apart result in fracture within the rubber compound, not between the rubber and the metal. However, the corrosion resistance of the rubber-metal composites is a serious problem in many applications. The composites may come into contact with corrosive media, such as salt water, and must display correspondingly adequate corrosion resistance. In principle, the entire rubber-metal composite could be over-lacquered after it has been produced. However, lacquers which must be stoved at a temperature at which rubber sustains damage cannot be used for this purpose. Lacquers which require no stoving do not, however, afford adequate corrosion protection. Even with lacquers which offer good corrosion protection, corrosion problems may arise if the lacquer cracks or flakes off owing to mechanical deformation of the composite.

The prior art proposes various possibilities for improving the corrosion protection of rubber-metal composites. DE-A-27 48 686 describes a process for increasing the corrosion resistance of a rubber-metal structure, in which an epoxy resin-based powder coating is applied to the metal surface before it is bonded with the rubber. The latter coating has the drawback that it softens at rubber vulcanising temperatures. Since vulcanising is generally carried out under pressure, there is a risk of displacement of the rubber on the softened base. The same risk arises when it is subsequently subjected to load at a temperature higher than the softening point of the powder coating (upwards of about 50° C.). Such temperatures may easily be reached in a motor vehicle which is parked in the sun, for example.

EP-A-54 861 proposes coating the metal by cataphoretic dip coating before the rubber is applied. Firstly, this is costly in plant terms, because, before cataphoretic dip coating, the metal surface must be pre-treated chemically, for example, by phosphating and post-rinsing. This necessitates the introduction of a number of process steps upstream, and hence a number of treatment baths. Secondly, cataphoretic dip coating is heavy on energy consumption and thus has economic disadvantages.

An object of the present invention is to provide a novel process for producing a rubber-metal composite. The metal should here be coated with a protective coating offering a known good corrosion-protecting effect before the rubber is applied. The latter protective coating should be able to be applied in a manner which is technically simple and hence economical, and should not soften under the conditions which prevail during rubber vulcanising.

Accordingly, a first embodiment of the present invention relates to a process for producing a rubber-metal composite on a metal, characterised in that:

(a) a self-depositing resin is deposited on the metal and cured;
(b) if desired, a primer is applied to the resin;
(c) a binder is applied to the primer or the self-depositing resin;
(d) a natural or synthetic rubber is applied to the binder; and
(e) the rubber is vulcanised at a temperature within the range from 90 to 220° C.

Metals which are suitable as the metal substrate are those whose ions bring about coagulation and deposition of the self-depositing resin. Metals currently considered for this purpose are in particular cast iron, steel or other iron-containing substrates. The process is accordingly preferably carried out with the use of iron-containing substrates. However, it may also be carried out on zinc or galvanised steel if baths of self-depositing resins are selected which are suitable for the purpose, and/or suitable pre-rinses are used. Other metal substrates are also considered where self-depositing resins are available for them.

The self-depositing resins which are usable within the meaning of the present invention are also designated in the art "autophoretic resins or "autophoretic lacquers". The expression "Autophoretic® Coating Chemicals" is common parlance in the English-speaking world, where the abbreviation-"ACC®" is frequently used. The principle of autophoretic lacquer deposition is as follows: an acid aqueous emulsion of an organic polymer is prepared. When a metal surface is brought into contact with such an emulsion, the acid acts to dissolve metal ions out of the surface. The metal ions bond with the polymer particles and bring about coagulation of the latter. As this process takes place directly on the metal surface, the coagulated polymer is deposited as a coating on the metal surface. When the metal surface is covered completely with polymer, the process comes to a halt. The layer thicknesses obtained in this process are generally within the range from about 15 to about 30 µm. When coating is concluded, the metal parts are removed from the treatment bath, and excess treatment emulsion is rinsed off with water. A reactive post-rinse frequently follows, which improves both the adhesion of the autophoretic lacquer to the metal and also the corrosion protection. Solutions of chromic acid and/or of chromates are, for example, considered here. The resin is then cured by heating to a temperature within the range from 140 to 250° C., preferably 150 to 180° C.

The self-depositing resins which are usable in the process according to the present invention are known as such in the prior art of coating metal parts. The corrosion-protecting effect thereof is sufficiently well-tried. Examples of self-depositing resins such as may be used in the process according to the present invention are listed in WO 93/15154. This publication names as examples urethane resins, epoxy resins, polyester resins and resins based on various acrylates. Specific examples of acrylic resins are those such as contain one or more of the following monomers: methyl acrylate, ethyl acrylate, butyl acrylate, 2-hydroxyethyl acrylate, 2-hydroxypropyl acrylate, 2-ethylhexyl acrylate, methyl methacrylate, ethyl methacrylate, n-butyl methacrylate, 2-hydroxyethyl methacrylate, 2-hydroxypropyl methacrylate, glycidyl acrylate, glycidyl methacrylate, acrylamide, methacrylamide, acrylic acid and methacrylic acid, and acrylic-alkyd resins. The latter acrylates may be present as copolymers with ethylene, styrene, vinyl chloride, vinylidene chloride and vinyl acetate.

Epoxy-based resins which may also be used within the framework of the process according to the present invention are described, for example, in WO 97/07163. Apart from pure epoxy resins, epoxy acrylate-based resins are suitable.

In addition to the self-depositing resin and the acid, the emulsions frequently contain oxidants and/or fluoride ions. These improve the deposition process. Examples of such process variants which may be used in the cycle of the process according to the present invention are: EP-A-32 297, EP-A-374 772, WO 93/15154 and WO 93/16813.

As is conventional when coating metal parts for corrosion protection, it is also preferred in the process according to the present invention to carry out an intermediate rinse using an aqueous solution of chromic acid or of chromates between deposition of the self-depositing resin and curing.

The self-depositing resin is cured at a temperature within the range from 140 to 250° C., in particular 150 to 180° C.

If desired, a so-called primer may now be applied to the self-depositing resin. This part step is not, however, absolutely necessary to the success of the process according to the present invention. Primers are generally dispersions of organic polymers in organic solvents. Phenolic resins, chlorinated rubber and epoxy resins, for example, may be used and may also be combined with one another for use. Phenolic resins are preferably combined with either chlorinated rubber or epoxy resins. The primers may additionally contain metal oxides and/or fillers as additives. The primers are dried at a temperature within the range from about 20 to 100° C. after they have been applied. The dry layer thickness is generally from about 7 to about 10 $\mu$m. Aqueous primer dispersions may also be used in place of dispersions in organic solvents.

In a further process step, a binder is applied to the primer layer or, if primer has been omitted, to the cured self-depositing resin. Like the primers, such binders are known in the prior art of producing rubber-metal composites. The conventional industrial binders are generally based on a mixture of halogenated polymers, such as chlorinated rubber, and cross-linking agents. Fillers may additionally be present. The bond between the rubber and the binder is improved if the binder additionally contains nitroso-substituted aromatics. An example of these which is common in industry is p-dinitrosobenzene. The binders are generally present as solvent-containing dispersions. They are dried at from 20 to 100° C., wherein a layer thickness of from about 10 to about 15 $\mu$m is adjusted. Water-based binders are also available and may be used in the cycle of the process according to the present invention.

In a subsequent part step, a natural or synthetic rubber is applied to the binder. The rubber may be selected, for example, from natural rubber, styrene-butadiene rubber, ethylene rubber, propylene rubber, diene rubber and nitrile-butadiene rubber. All the rubber types which are cross-linkable by high-temperature vulcanising are suitable here. The following rubbers are examples: NR, IR, IIR, NBR, HNBR, CR, ACM, CSM, AEM, SBR and EPDM. Preferred rubbers are: NR, TR and NBR.

The rubber is vulcanised at a temperature within the range from 90 to 220° C., preferably within the range from 120 to 190° C. The rubber compound is preferably compression-molded against the substrate during the vulcanising step. In this case, pressures within the range from about 50 to about 200 bar are applied. The vulcanising time is generally dependent on the type of rubber used and the size of the structures. It may therefore vary within broad limits and may, for example, be within the range from about 5 to about 120 minutes. For example, vulcanising may take place at a temperature within the range from 150 to 180° C. for a duration of 10 minutes at a compression molding pressure of about 100 bar. Initial pre-vulcanising for a defined duration at a low temperature, followed by complete vulcanising at elevated temperature, is frequently to be recommended. For example, pre-vulcanising may be for a duration within the range from about 5 to about 15 minutes at a temperature between about 90 and about 120° C., and complete vulcanising for a duration within the range from about 10 to about 20 minutes at a temperature within the range from about 160 to about 190° C.

A second embodiment of the present invention relates to a composite structure prepared from metal and rubber, which contains between the metal surface and the rubber a cured layer of a self-depositing resin. Here, at least a binder layer, if desired both a primer layer and a binder layer, is preferably present between the layer of a self-depositing resin and the rubber. The self-depositing resins, rubbers, primers and binders which are considered for this purpose have been described in greater detail hereinabove.

The composite structures according to the present invention and obtainable by the process according to the present invention have the advantage of the presence, between the metal and the rubber, of the layer of self-depositing resin which provides good corrosion protection. Composite structures are frequently constructed such that not all of the metal surface is covered with rubber. The metal surface that is not covered with rubber, however, lies beneath the continuous layer of self-depositing resin and is protected by it from corrosion. The layer of self-depositing resin coats all of the metal surface irrespective of whether or not it is followed by the rubber. This means that the place where the rubber coating starts is prevented from being a point of corrosion attack.

The cycle of the process according to the present invention may, for example, be embodied in the following treatment cycle:

1. alkaline cleaning
2. rinse
3. rinse using completely deionised water
4. deposition of the self-depositing resin
5. rinse
6. rinse using a reactive rinse (may be omitted, in particular when epoxy-based self-depositing resins are used)
7. drying
8. optional application and drying of primer
9. application and drying of binder
10. application and vulcanising of the rubber.

EXAMPLES

The dry adhesion of the rubber-metal composite was examined by means of a peel test according to DIN 53531, Part 1. ST 37 ASTM-B test pieces which were not abrasive-blasted were used. After coating with the self-depositing resin, in a first test series with no reactive post-rinse of the self-depositing resin and without the use of a primer, the organic-based binder Chemosil® 411 was applied by dip coating, or the water-based binder XW 7484 by brushing. Natural rubber NR 11426 and synthetic nitrile-butadiene rubber NBR 60041 were used as the rubber. The rubber was cured at 160° C. at a compression molding pressure of 100 bar for 10 to 30 minutes.

The adhesion values were determined in daN/mm, and the tearing behavior was then evaluated on a tearing machine.

The results are compared in Table 1 with a standard treatment (without ACC coating: sheet metal+primer+binder+rubber). They show that adhesion values similar to those obtained by standard processes are obtainable using the rubber-metal composite according to the present invention. As is known, however, the standard processes do not afford the corrosion-protecting effect that is obtained by coating with the self-depositing resin.

TABLE 1

Rubber-metal bond on epoxy-based self-depositing resins
(each figure = average of 3 measurements)

| | | Layer | | Rubber NR 11426 | | Rubber NBR 60041 | |
|---|---|---|---|---|---|---|---|
| Example No. | Resin | thickness (μm) | Binder | Adhesion (daN/mm) | Tearing behavior[1] | Adhesion (daN/mm) | Tearing behavior[1] |
| Example 1 | Epoxy | 15–20 | Chemosil® 411 | 29 | 95 R/M | 93 | 100 R |
| Example 2 | Epoxy/acrylic mixture | 20 | Chemosil® 411 | 29 | 100 R | 99 | 100 R |
| Comparative Example 1 | Standard[2] | | Chemosil® 411 | 28 | 100 R | 96 | 100 R |
| Example 3 | Epoxy | 15–20 | XW 7484 | 30 | 95 R/CP | 73 | 45 R/CP |
| Example 4 | Epoxy/acrylic mixture | 20 | XW 7484 | 30 | 95 R/CP | No adhesion | No adhesion |
| Comparative Example 2 | Standard[3] | | | 26 | 100 R | — | — |

[1] R = separation within rubber (number = percentage area affected by tearing)
M = separation between metal and adhesive
CP = separation between ACC layer and binder
[2] Sheet metal (abrasive-blasted) with Chemosil® 211 primer
[3] Sheet metal (abrasive-blasted) with XW 1180 primer Table 2 shows the adhesion values and tearing behavior when the acrylate-based self-depositing resin Autophoretic® 703, from Henkel Surface Technologies, is used. After deposition of the self-depositing resin, a reactive rinse was carried out using chromic acid-containing solutions at various concentrations, and the resin was cured as indicated in Table 2. Various binders were used, both with and without the intermediate application of a primer. The binders and primers are commercial products of Henkel KGaA, Düsseldorf. The testing procedures, comparative tests, rubber types used and vulcanising conditions were as indicated hereinabove.

TABLE 2

Rubber-metal bonds on acrylate-based self-depositing resin (each figure = average of 3 measurements);
products and evaluation: cf. Table I; Comparative Examples: sheet metal abrasive-blasted.

| Example No. | Reactive rinse | Curing of resin | Primer | Binder | Adhesion test (daN/mm) | Tearing behavior |
|---|---|---|---|---|---|---|
| a) Rubber: NR 11426 | | | | | | |
| Example 5 | 4.04 g/l Cr(VI) | 10 mins. 107° C. 15 mins. 180° C. | Chemosil 211 | Chemosil 222 | 29 | 100 R |
| Example 6 | 4.04 g/l Cr(VI) | 10 mins. 107° C. 15 mins. 180° C. | — | Chemosil 222 | 27 | 100 R |
| Example 7 | 1.13 g/l Cr(VI) | 10 mins. 107° C. 15 mins. 180° C. | XW 1180 | XW 7484 | 26 | 100 R |
| Example 8 | 1.13 g/l Cr(VI) | 10 mins. 107° C. 15 mins. 180° C. | Chemosil 211 | Chemosil 222 | 31 | 100 R |
| Example 9 | 1.13 g/l Cr(VI) | 10 mins. 107° C. 15 mins. 180° C. | — | Chemosil 222 | 29 | 100 R |
| Example 10 | 1.13 g/l Cr(VI) | 10 mins. 107° C. 15 mins. 180° C. | XW 1180 | XW 7484 | 30 | 100 R |
| Example 11 | 1.13 g/l Cr(VI) | 10 mins. 107° C. | Chemosil 211 | Chemosil 222 | 32 | 100 R |
| Example 12 | 1.13 g/l Cr(VI) | 10 mins. 107° C. | — | Chemosil 222 | 36 | 100 R |
| Example 13 | 1.13 g/l Cr(VI) | 10 mins. 107° C. | XW 1180 | XW 7484 | 27 | 100 R |
| Example 14 | 1.13 g/l Cr(VI) | 10 mins. 107° C. | — | XW 7484 | 29 | 100 R |
| Comparative Example 3 | | | Chemosil 211 | Chemosil 222 | 28 | 100 R |
| Comparative Example 4 | | | XW 1180 | XW 7484 | 28 | 100 R |
| b) Rubber: NBR 60041 | | | | | | |
| Example 16 | 4.05 g/l Cr(VI) | 10 mins. 107° C. 15 mins. 180° C. | Chemosil 211 | Chemosil 222 | 88 | 95 R |
| Example 17 | 4.05 g/l Cr(VI) | 10 mins. 107° C. 15 mins. 180° C. | — | Chemosil 222 | 83 | 95 R |
| Example 18 | 1.13 g/l Cr(VI) | 10 mins. 107° C. 15 mins. 180° C. | Chemosil 211 | Chemosil 222 | 93 | 100 R |
| Example 19 | 1.13 g/l Cr(VI) | 10 mins. 107° C. | Chemosil 211 | Chemosil 222 | 81 | 100 R |
| Comparative Example 5 | | | Chemosil 211 | Chemosil 222 | 86 | 100 R |

What is claimed is:

1. A process for producing a rubber-metal composite comprising applying a vulcanizable rubber to a metal substrate bearing a lacquer coating and a binder on top of said lacquer coating and vulcanizing said vulcanizable rubber while applying a pressure of from about 50 to about 200 bar to said vulcanizable rubber to form the rubber-metal composite, wherein the lacquer coating is a cured self-deposited resin.

2. The process of claim 1 wherein said vulcanizing is performed at a temperature of from 90° C. to 220° C.

3. The process of claim 1 wherein the metal substrate additionally bears a primer between the lacquer coating and the binder.

4. The process of claim 3 wherein the primer is selected from the group consisting of phenolic resin-based primers, chlorinated rubber-based primers, epoxy resin-based primers and mixtures thereof.

5. The process of claim 1 wherein the self-deposited resin is selected from the group consisting of acrylate-based resins, acrylic-alkyd-based resins, epoxy-based resins, epoxy-acrylate based resins, and mixtures thereof.

6. The process of claim 1 wherein the binder is derived from a mixture comprised of one or more halogenated polymers and one or more cross-linking agents.

7. The process of claim 1 wherein the binder comprises at least one nitroso-substituted aromatic.

8. The process of claim 1 wherein the vulcanizable rubber is selected from the group consisting of natural rubber, styrene-butadiene rubber, ethylene rubber, propylene rubber, diene rubber, nitrile-butadiene rubber, and mixtures thereof.

9. The process of claim 1 wherein the metal substrate is comprised of iron.

10. A process for producing a rubber-metal composite comprising (a) self-depositing a resin on a metal substrate;
    (b) curing the resin deposited in step (a) to form a lacquer coating;
    (c) applying a binder to the lacquer coating;
    (d) applying a vulcanizable rubber to the binder; and
    (e) vulcanizing the vulcanizable rubber while applying a pressure of from about 50 to about 200 bar to said vulcanizable rubber to form the rubber-metal composite.

11. The process of claim 10 wherein vulcanizing step (e) is performed at a temperature of from 90° C. to 220° C.

12. The process of claim 10 wherein curing step (b) is performed at a temperature of from 140° C. to 250° C.

13. The process of claim 10 wherein said resin is selected from the group consisting of acrylate-based resins, acrylic-alkyd-based resins, epoxy-based resins, epoxy-acrylate-based resins and mixtures thereof.

14. The process of claim 10 wherein an intermediate rinse using an aqueous solution comprised of chromate, chromic acid or a combination thereof is performed between step (a) and step (b).

15. The process of claim 10 comprising an additional step of applying a primer to the lacquer coating after step (b) and before step (c).

16. The process of claim 15 wherein the primer is selected from the group consisting of phenolic resin-based primers, chlorinated rubber-based primers, epoxy resin-based primers and mixtures thereof.

17. The process of claim 10 wherein the binder is derived from a mixture of one or more halogenated polymers and one or more crosslinking agents.

18. The process of claim 10 wherein the binder comprises at least one or more nitroso-substituted aromatic.

19. The process of claim 10 wherein the vulcanizable rubber is selected from the group consisting of natural rubber, styrene-butadiene rubber, ethylene rubber, propylene rubber, diene rubber, nitrile-butadiene rubber, and mixtures thereof.

20. The process of claim 10 wherein the metal substrate is comprised of iron.

* * * * *

UNITED STATES PATENT AND TRADEMARK OFFICE
CERTIFICATE OF CORRECTION

PATENT NO.    : 6,379,752 B1  
DATED         : April 30, 2002  
INVENTOR(S)   : Schelbach et al.

It is certified that error appears in the above-identified patent and that said Letters Patent is hereby corrected as shown below:

<u>Title page,</u>
Item [73], Assignee, delete "Dusseldorf", and insert therefor -- Duesseldorf --.

Signed and Sealed this

Thirteenth Day of May, 2003

JAMES E. ROGAN  
*Director of the United States Patent and Trademark Office*